Oct. 4, 1960 C. F. FREY 2,955,198

CONVERTIBLE VHF TELEVISION TUNER

Filed Sept. 6, 1957 5 Sheets-Sheet 1

INVENTOR.
CLEON F. FREY

BY

OSTROLENK, FABER, GERB & SOFFEN

ATTORNEYS

Oct. 4, 1960 C. F. FREY 2,955,198

CONVERTIBLE VHF TELEVISION TUNER

Filed Sept. 6, 1957 5 Sheets-Sheet 2

INVENTOR.
CLEON F. FREY

BY

OSTROLENK, FABER, GERB & SOFFEN
ATTORNEYS

CONVERTIBLE VHF TELEVISION TUNER

Filed Sept. 6, 1957 5 Sheets-Sheet 3

INVENTOR.
CLEON F. FREY
BY
OSTROLENK, FABER, GERB & SOFFEN
ATTORNEYS

Oct. 4, 1960 C. F. FREY 2,955,198

CONVERTIBLE VHF TELEVISION TUNER

Filed Sept. 6, 1957 5 Sheets-Sheet 4

INVENTOR.
CLEON F. FREY

BY Ostrolenk, Faber,
Gerb & Soffen
ATTORNEYS

Oct. 4, 1960 C. F. FREY 2,955,198

CONVERTIBLE VHF TELEVISION TUNER

Filed Sept. 6, 1957 5 Sheets-Sheet 5

INVENTOR.
CLEON F. FREY

BY Strolenk, Faber, Gerb & Soffen

ATTORNEYS

United States Patent Office 2,955,198

Patented Oct. 4, 1960

2,955,198

CONVERTIBLE VHF TELEVISION TUNER

Cleon F. Frey, Pasadena, Calif., assignor to Standard Coil Products Co., Inc., Melrose Park, Ill., a corporation of Illinois Filed Sept. 6, 1957, Ser. No. 682,357

4 Claims. (Cl. 250—20)

This invention relates to improvements in tuners for television reception and more particularly to novel arrangements for converting a VHF television tuner for UHF reception.

The tuner of the present invention is basically of the disk type construction, corresponding to the tuner of my patent application Serial No. 627,793 (B–126) filed December 12, 1956, entitled "Compact VHF Television Tuners," assigned to the same assignee as the present case.

The present invention is directed toward providing a simple and inexpensive device and method for converting a disk-type VHF television tuner for reception of UHF signals heterodyned to the intermediate frequency. It is now generally the practice to employ a UHF tuning unit for receiving the seventy UHF channels in the range of 470 to 890 megacycles. Such UHF tuning unit includes an oscillator stage which heterodynes the incoming UHF channels to a predetermined intermediate frequency, such as 40 megacycles. The signal level of such heterodyned UHF signals is relatively low, and requires substantial amplification before introduction to the IF section of the television receiver. Heretofore VHF tuners, through complex mechanisms and circuitry, have been converted to two-stage IF amplifiers at the selected IF frequency for amplifying the heterodyned UHF signals.

In accordance with the present invention, such UHF conversion of the VHF tuner is accomplished inexpensively, with a minimum of components and circuitry. While the invention is particularly described, in the exemplary embodiment, in connection with the aforesaid disk-type tuner, it of course will be understood to have wider application by those skilled in the art. The disk-type tuner is a compact unit having twelve sets of VHF coils arranged radially, with the associated contacts thereof selectively connectible to a fixed set of contactors. The fixed contactors complete the circuit of selected VHF channel coils with the fixed tuner circuitry A "thirteenth position" is provided on the disc tuner for the UHF transfer or conversion, as described in the aforesaid patent application. A cylinder cover and shield encloses the coil disk, the many coils and the other circuitry of the tuner.

In accordance with my invention I arrange the UHF conversion of the VHF tuner into a two-stage IF amplifier, with the VHF oscillator becoming inactivated, and connect the output of the VHF tuner at the intermediate frequency to the receiver circuit. In accordance with the exemplary form of the invention, the simple cylindrical shield cover of the VHF tuner is replaced by a corresponding "UHF cover." Suitable projecting contact-caps are slipped onto otherwise clear pins of the "thirteenth" or UHF set of pins on the VHF coil disk, for selective coaction thereof with the fixed contactors in the UHF conversion cover. In this manner, no interaction between the circuitry of the UHF cover occurs for the twelve VHF channel reception positions of the VHF tuner. Only the UHF or "thirteenth position" contacts the spring contactors of the cover circuit for UHF reception by the VHF tuner.

Also, a further important feature of the invention is the provision of the anode or B+ supply for the oscillator of the UHF tuning unit through the UHF cover section. Such B+ potential is obtained from the VHF tuner circuitry. In this manner, the UHF tuning unit is directly inactivated during VHF reception. The UHF tuner, having its oscillator tube connected to the heater supply is in constant readiness for UHF tuning as seen as the VHF tuner is positioned to the UHF or "thirteenth position," and thereupon provides the UHF oscillator with the B+ supply and promptly energizes it.

The invention of this UHF cover requires a depth increase of only a nominal amount to accommodate the UHF conversion circuitry and present fixed spring contactors for the "thirteenth position" pins on the VHF tuner disk. In practice, an increase of the order of one-half inch is sufficient to provide UHF conversion through the UHF cover. The cost of the UHF cover is very nominal as it contains only few components to accomplish the herein stated functions and results. In this manner, the purchaser of a VHF tuner is not penalized in cost as no circuits or parts are needed to accommodate it for UHF reception except the "thirteenth position" of simple pins.

At the present time at least ninety percent of the television receivers sold are VHF only. The present invention, when used for UHF, requires the small added cost in the form of the UHF conversion cover solely for UHF–VHF use of the VHF tuner. The invention accordingly fills an important need in having a basic, efficient, compact, VHF tuner which is readily convertible for UHF reception in the above stated manner, without adding to its cost. The same basic VHF tuner is manufactured in mass production regardless of its ultimate range of use in the television receiver. The simple UHF cover serves to convert the basic VHF tuner for combined UHF–VHF reception.

Accordingly, it is an object of the present invention to provide a novel television tuner which is readily and inexpensively convertible for UHF reception.

Another object of the present invention is to provide a novel method and means for converting a VHF television tuner for UHF reception.

A further object of the present invention is to provide a novel UHF conversion cover for a disk-type VHF tuner, whereby the tuner is directly convertible to a two-stage amplifier for UHF reception.

Still another object of the present invention is to provide a novel, inexpensive, compact conversion unit for a VHF tuner distinct from the VHF basic design, without penalizing the VHF tuner for such a UHF conversion.

Still a further object of the present invention is to provide a novel system and circuit for converting a disk-type VHF tuner to a two-stage amplifier at the intermediate frequency in conjunction with a separate UHF tuning unit.

These and further objects of the present will become more apparent in the following description of an exemplary embodiment thereof, illustrated in the drawings, in which.

Figures 1, 2, 3:
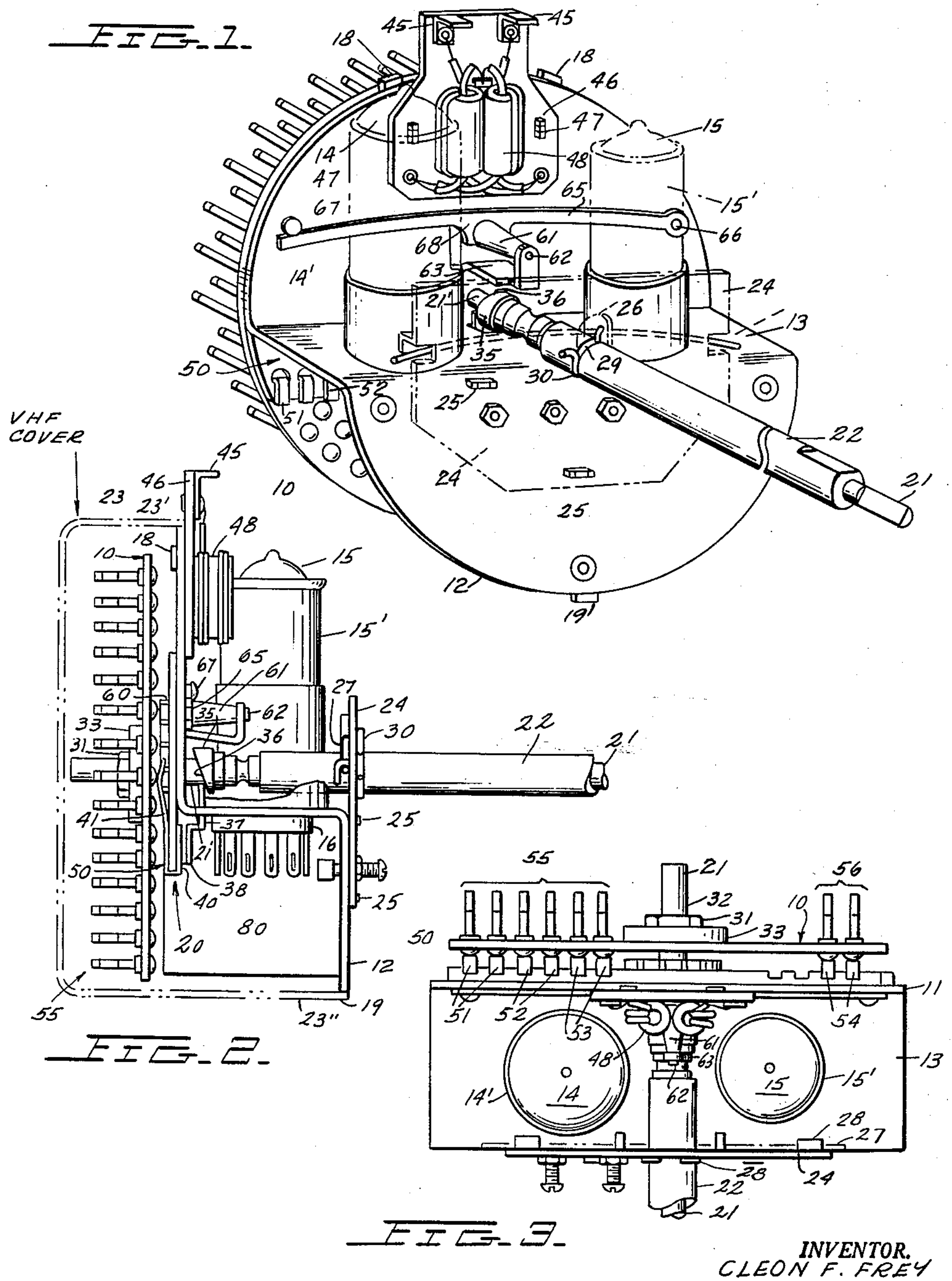
Figure 1 is a perspective view of a disk-type tuner, with the shield cover removed.
Figure 2 is a side elevational view of the VHF tuner in Figure 1, with the VHF cover indicated in dotted lines.
Figure 3 is a plan view of the tuner embodiment of Figure 1.

Referring to Figures 1, 2 and 3 which are respectively, perspective, elevational and top view of the exemplary VHF tuner, it is noted that the tuner is arranged in a cylindrical shape subtending a circular tuning disk 10. The tuner is illustrated without electrical circuit components, as resistors, condensers, coils, wiring, etc., in order to more clearly set forth its mechanical aspects and their interrelationships. Electrical circuitry used in the invention tuner is described hereinafter in connection with Figure 11.

Basically, the chassis of the tuner is formed with two parallel stepped sides 11, 12 separated by horizontal chassis platform 13. The separation between chassis section 11 and 12 across horizontal platform 13 corresponds to the space required to suitably mount the two electron tubes 14 and 15 in their respective connection sockets 16, 17 together with the electrical components associated therewith, including fine tuning arrangement 20. The stepped chassis 11, 12, 13 may be formed of a unitary sheet preferably of relatively heavy gauge, as it is utilized for supporting all the chassis components including the tubes 14, 15, the circuits, the tuning shafts 21, 22 and cylindrical shield 23 (dotted, in Figure 2).

The peripheral contour of the parallel chassis sides 11 and 12 is in the form to execute a circle when viewed in a direction perpendicular to their respective planes, in order that they may suitably fit into the plain cylindrical shield or cover 23. Shield 23 is the VHF shield replaceable by a UHF conversion cover to be described hereinafter. Shield 23 has a lower portion 23″ projecting forward to chassis face 12 (see Figure 2). The bottom extension 23″ has a transverse slot which latches with lug 19 on front plate 12. The upper extension 23′ of shield 23 has two slots that latch with lugs 18, 18′ on back plate 11. The cover shield 23 is thus gripped in position. While a cylindrical form for the cover-shield 23 and chassis 11, 12 arrangement has been illustrated, it is to be understood that other shapes are equally feasible. The circular and cylindrical pattern is used to conserve weight, size and material costs.

A shaft support plate 24 is suitably secured to front chassis panel 12 as by rivets or staked lugs 25, 25. Channel selector shaft 21 is concentrically housed within the fine tuning shaft 22 which in turn is rotatably mounted in opening 26 in plate 24. A spring wire 27 is bowed between lugs 28, 28 of plate 24 and pressed against fine tuning shaft 22 centrally of spring 27. A spring washer 30 coacts with an annular groove 29 in shaft 22 adjacent the plane of plate 24. The combination of spring wire 27 and spring washer 30 holds shaft assembly 22, with shaft 21 therein, in smooth rotatable relationship in plate 24. The interior portion 21′ of the control shaft 21 is housed within an opening in rear chassis panel 11 (see Figures 1, 2 and 4).

The rotatable coil disk 10 is suitably secured, as by nut 31, threads 32 and collar 33 to control shaft 21. Shaft 21 is thus rotatably supported between vertical chassis panel 11 and support bracket 24. The fine tuning shaft 22 rotates about control shaft 21, and is anchored against axial displacement by springs 27 and 30. Fine tuning shaft 22 has laterally cammed surface 36 which coacts with a projecting lip 37 of spring mounted condenser plate 38 of condenser assembly 20. The end portion 39 of metallic condenser plate 38 is secured to the chassis.

Condenser plate 38 is resilient, of spring type material with its projecting lug 37 biased against the cammed surface 36 at the interior end of fine tuning shaft 22. Fixed fine tuning condenser plate 40 coacts with displaceable condenser plate 38 and is connected directly to contactor 41 in the oscillator circuit (to be described). Rotation of fine tuning shaft 22 executes a corresponding displacement of fine tuning condenser plate 38 with respect to fixed condenser plate 40 to effect the fine tuning for the tuner in its VHF reception mode. The fine tuning element is thus close to the oscillator circuit.

The VHF antenna input terminals 45, 45 for the tuner extend from dielectric plate 46 staked to rear vertical chassis panel 11 by projecting lugs 47, 47 thereof. The antenna terminals 45, 45 are connected to a balun antenna transformer 48 of the tuner circuit. The vacuum tubes 14 and 15 are suitably shielded by corresponding shields 14′ and 15′ to minimize radiation. The chassis structure 11, 12, 13 serves to shield the circuit components of the tuner from radiation, in conjunction with snap-on cylindrical shield 23.

The fixed electrical components on the tuner chassis, and in circuit with vacuum tubes 14, 15, are similar to the fixed electrical components in a turret or other comparable tuners having movable coil assemblies and correspond to the circuit components other than the movable selective channel coils to be described hereinafter.

The intercircuit connections between the fixed tuner chassis circuit and movable coil disk 10 are effected through contactor assembly board 50 having a plurality of individual contactor pairs 51, 52, 53 and 54. It is to be noted that contactor pair 54 is arranged substantially diagonally opposite main contactor pairs 51, 52 and 53 to contain all the coil sections for each channel, and for other advantageous purposes, as will be more fully set forth. The contactors of assembly 50 are biased against the contact surface of disk 10 in conjunction with radially disposed contact pins 55, 56 arranged in predetermined arrays or patterns as will be detailed.

The exemplary tuner is arranged with twelve sets of coils for the existing twelve VHF channels, plus a thirteenth transfer circuit position. The transfer or thirteenth position is used for connection of a UHF turner unit through the VHF turner, converted circuitally thereby to a two-stage IF amplifier, as shown and described hereinafter. A detent gear 60 is secured firmly with control shaft 21 for suitably indexing the disk 10 to angular positions. The thirteen disk positions are such that angular rotation of shaft 21 will effect accurate coaction between contactors 51, 52, 53 and 54 and the associated contact heads of the selected contact pin sets 55, 56.

An effective and simple detent is arranged with gear 60 for the compact tuner assembly hereof. A conical member 61 is pivotally anchored in bearing 62 at the end of a projection or bracket 63 extending from chassis panel 11. Conical member 61 extends through chassis panel 11 and coacts with detent gear 60, with its cylindrical head 64 riding between the gear teeth for the detenting action. A linear spring 65 is anchored between rivets 66, 67 in panel 11 with its central portion 68 coacting with conical body 61, pressing the associated detent head 64 against detent gear 60. Spring 65 presses detent member 61, 64 pivoted at 62 against toothed detent wheel 60 to effect the predetermined angular dispositions of disk 10 with respect to fixed contactor assembly 50 as will now be understood by those skilled in the art.

The fixed contactor assembly 50 comprises an insulation frame 70 secured to the rear circular chassis panel 11 by rivets 71, 72. Contactor frame 70 has a central opening 73, subtending detent gear 60 and its coacting detent head 64 biased against gear 60 (see Figures 4 and 6). Spring contactor pairs 51, 52, 53 are arranged on one side of frame 70 within corresponding vertical slots 74, 74. There are three sets of two contactors each 51, 52, 53 for corresponding coaction with individual radially disposed contact heads of pin set 55. More or less than the exemplary six contactors and pins for this group may be used.

Figures 4, 5, 6:
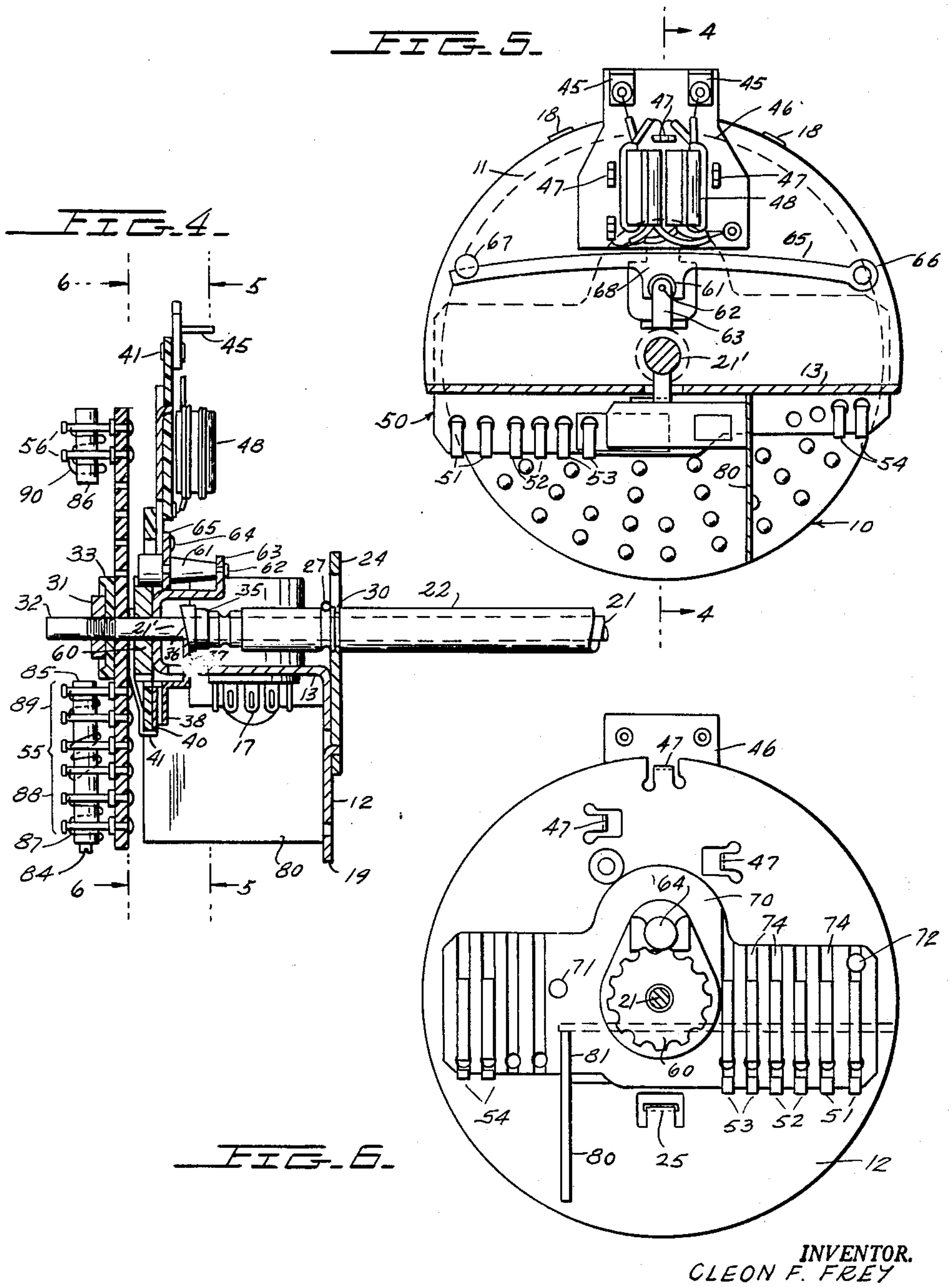
Figure 4 is a vertical cross-sectional view through the tuner of Figures 1, 2 and 3.
Figure 5 is a vertical sectional view through the tuner, taken along the line 5—5 of Figure 4.
Figure 6 is a vertical sectional view through the VHF tuner, taken along the line 6—6 of Figure 4.
Figures 7, 8, 9, 10:
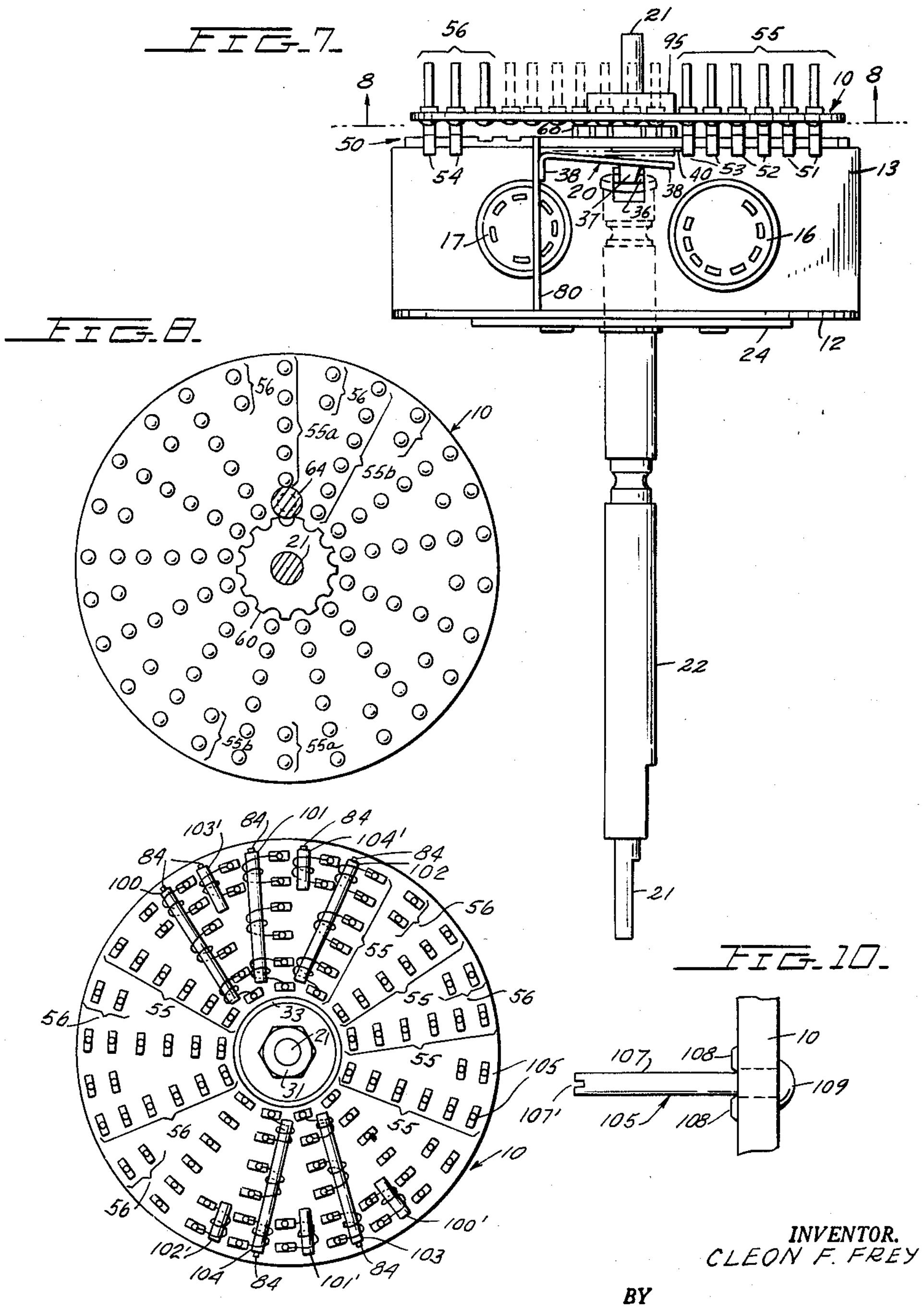
Figure 7 is a bottom view of the VHF tuner of Figures 1 to 6.
Figure 8 is a plan view of the contact side of the tuner coil disk as seen along the line 8—8 of Figure 7.
Figure 9 is a rear view of the tuner, illustrating VHF coil assemblies on the tuner disk.
Figure 10 is an enlarged view of a connection pin on the tuner disk.

Corresponding contactors are used on the opposite diametrical side of a given contactor set 51, 52, 53; namely, the corresponding pair of contacts 54 seen in Figure 6, as well as in Figures 3 and 7. Disposition of portions of each channel coil set on opposite sides of the axis also has circuital advantages in the tuner. Such coil and disk arrangement of the tuner results in a direct circuitwise relation with vacuum tubes 14, 15 and their corresponding connection sockets 16, 17. Tubes 15, 16 are in parallel disposition with disk 10, as shown in Figures 1, 3 and 7, and each tube is on opposite sides of tuner shafts 21, 22 for compactness as well. In other words, by spreading out radially the coil sets required for each of the channels, not only is there the advantage of a smaller tuner construction, but it also permits the disposition of the two vacuum tubes on opposite sides of the tuner axis and parallel to the disk 10, with correspondingly minimum lengths of wiring interconnection of the associated contactors 51, 52, 53, 54 to the tuner circuitry.

Contactors 54 are connected to the VHF antenna input circuit of the tuner, while contactors 51, 52, 53 are connected to the RF output, VHF oscillator and mixer circuitry. A metallic shield 80 is secured to forward panel 12 and projects to a slot 81 in the contactor frame 70. Shield 80, as shown in Figures 4, 5 and 6, is used to isolate the input antenna section of the tuner circuitry from the output oscillator section. In view of the small compartment for all the tuner circuitry in the VHF tuner, only a relatively small shield 80 is required.

Figure 7 is a bottom view of the tuner embodiment, clearly illustrating the electrical coaction between the fixed contactor assembly 50 with rotatable disk 10. Disk 10 is secured to the end of control shaft 21 through nut 95. The contactors 51, 52 and 53 are in spring contact engagement with a set of six contact pins 55, and the remotely disposed contact pair 54 with contact pins 56. Contact pin sets 55 for the twelve VHF channel positions 2 to 13 have a series of predetermined coils connected therebetween, as is illustrated in Figures 4 and 9; likewise, contact pin set 56 has corresponding coil interconnections.

It is to be understood that the sets of pins 55 and 56, illustrated in Figures 3 and 7, correspond to connections for individual sets of coils for the broadcast VHF channels. The rotatable disk 10 contains twelve sets of such companion associated coils for the respective VHF channels to be tuned in. Only one set corresponding to each channel is connected with the contactor assembly 50 for each of the detented positions of disk 10. The thirteenth set of aligned contacts 55, 56 is left unconnected in the tuner as used in the present invention. In other words, there are no coils connected to the coil face of disk 10 in this thirteenth or UHF position. Use of a conversion UHF shield cover therewith is described hereinafter.

Figure 4 illustrates two coil forms 85 and 86 for the respective sets of contact pins 55, 56. Coil form 85 contains three individual coils 87, 88, 89 of predetermined inductances. Coil form 86 for the antenna input of the exemplary tuner contains the coil 90. The respective coils 87, 88, 89, 90 are connected for each channel to corresponding contactor pairs 51, 52, 53, 54 for each of the detented positions of disk 10. The mutual coupling and inductance values of the respective coils depend upon the parameters for properly tuning each of the associated broadcast channels in the VHF spectrum in conjunction with the basic fixed circuit of the tuner. The outer coil 87 is the oscillator inductance for the selected channel, and connects to the oscillator fixed circuitry. A tuning slug 84 threads into the outer open end of form 85 to adjust the oscillator frequency in the manner of turret tuners, through a suitable opening in the shield 23.

Figures 8 and 9 show the exemplary disposition of the coil sets for the associated channels. Thirteen sets of pin connections are used, with one "blank" set serving as a UHF transfer aircuit, e.g., for the UHF operation mode of the tuner. The use of an odd number of contact sets or positions results in the advantage that the associated opposed contacts 55, 56 may be arranged precisely in line or 180° apart as shown at **55*a*, 56*a* in Figure 8. In other words, the contacts 55*a* and their associated coils are in line with the antenna coil contacts 56*a*, on the diametrically opposite side of the disk 10 for any given channel selection. Similarly, contact set 55*b* is 180° opposite the antenna contact set 56*b***, and so on.

Figure 9 illustrates the coil side of disk 10 with corresponding associated coil sets disposed 180° apart. The RF output-mixer-oscillator coil sets 100, 101 and 102, etc., are associated with the respective diametrically opposite antenna coil sets 100', 101', 102', etc. Similarly, the antenna coil 103' between coils 100 and 101 corresponds to diametrically opposite multiple coil 103 as does antenna coil 104' to opposite coil set 104. The radially outward coils on the plural coil sets 100, 101, 102, etc., are the respective oscillator coils. The individual tuning slugs 84 are adjustable from the exterior of the tuner through an aperture in the shield. Such oscillator frequency adjustment opening is seen at 224 in the UHF cover 225 in Figure 14. The separation between the main coils (100, 101, etc.) and their companion coils (100', 101', etc.) at diametrically opposite sides of disk 10 is advantageous for electrical isolation and shielding therebetween, as well as to provide convenient and simple wiring to the fixed circuitry.

Figure 10 is an enlarged illustration of a pin 105 corresponding to each of the pins constituting pin sets 55, 56. The exemplary pin 105 contains body 106 projecting from disk 10. The tip portion 107 of pin 105 has a cut-out 107' to permit ready soldering or attachment of coil lead ends. The pin 105 is staked to disk 10 at 108. The head 109 of pin 105 projects smoothly on the contact side of disk 10 to establish firm electrical connection with the spring biased contacts of assembly 50. Other forms of pins than exemplary pin 105 may be employed for mounting the respective coils and effecting connection thereof to contact heads 109 for assembly 50 coaction.

Figure 11:
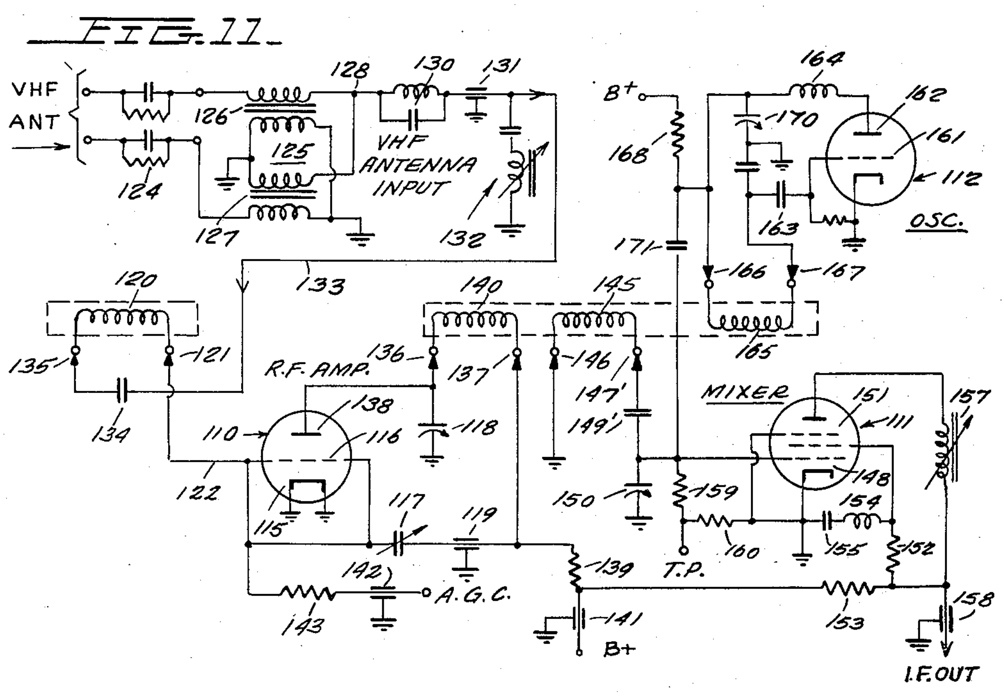
Figure 11 is a schematic circuit diagram of an exemplary circuit for the VHF tuner.

Figure 11 is a schematic electrical diagram of an exemplary circuit for the VHF tuner. The circuit of Figure 11 comprises a neutralized triode RF amplifier stage 110 in conjunction with mixer stage 111 and triode oscillator stage 112. It is to be understood that a pentode RF amplifier, a cascode RF amplifier, or a tetrode may instead be used with the invention system. The neutralized triode RF amplifier stage 110 corresponds to that shown and described in the copending patent application, Serial No. 600,496 (B–119) filed July 27, 1956, and assigned to the same assignee as this case. The stabilized and neutralized triode stage 110 contains parameters which the hereinsaid patent application more thoroughly defines for stabilized operation in the VHF range of frequencies. Such RF triode stage 110 has both ends of its cathode 115 grounded, and both ends of its grid electrode 116 interconnected. The input to RF amplifier stage 110 is through the antenna coil 120 for the desired VHF channel, and connected by contact 121 and lead 122 to grid electrode 116. The triode amplifier stage 110 is neutralized through the adjustable neutralizing condenser 117, the adjustable shunt output condenser 118, and feed-through condenser 119. Reference is made to the application Serial No. 600,496 (B–119) for details on the interrelationship of the parameters and adjustments for the condensers 117, 118 and 119 in the stabilized and neutralized triode amplifier stage 110 for the VHF tuner.

The VHF antenna input is at terminals 123 through the condenser-resistor filter units 124, 124 to balun transformer 125. Balun transformer 125 is comprised of two sectional transformers 126, 127, interconnected in the conventional manner between ground and the single-ended input of the tuner. The output terminal 128 of balun transformer 125 is connected through shunt trap 130, feed-through condenser 131, and series trap 132 to the selected VHF antenna coil 120 through lead 133 and coupling condenser 134, via contacts 135. The VHF antenna input circuit is accordingly a single ended connection through lead 133 through the series connected antenna coil 120 to the grid input 116 of amplifier stage 110. It is to be understood that as other VHF channels are selected, their associated antenna coils 120 are interconnected through the tuner disk to contacts 121 and 135 of the tuner circuit.

The output coil in the plate circuit of the RF amplifier stage 110 comprises RF output coil 140 for the selected channel, associated with the selected antenna coil 120. Coil 140 is connected to the amplifier circuit through contacts 136, 137. The B+ supply is supplied to the anode 138 of stage 110 through output coil 140 and dropping resistor 139. A feed-through condenser 141 is preferably used where the B+ lead enters the tuner chassis. An automatic gain control AGC connection is made to the grid 116 of stage 110 through feed-through condenser 142 and series resistor 143.

The output of the RF amplifier stage 110 is applied to the input of mixer stage 111 through the mutual coupling of mixer coil 145 with the output coil 140. The mixer coil 145 corresponds to the selected VHF channel, and is connected to the fixed circuitry through contacts 146, 147. One terminal of coil 145 is grounded and the other is connected to the control electrode 148 through coupling condenser 149. An adjustable shunt condenser 150 is fixed in the mixer circuit for tuning of coil 145. The screen grid 151 of stage 111 is connected to the B+ supply through appropriate dropping resistors 152, 153, and is connected to ground through a series inductance-capacity circuit 154, 155. The output of mixer stage 111 extends from anode 156 through tunable inductor 157 which connects to the IF output through the chassis to feed-through condenser 158. The intermediate frequency of the exemplary tuner is of the order of forty megacycles. A test point TP connects to the mixer stage, extending from resistors 159, 160 between the grid thereof and ground.

The oscillator circuit comprises triode 112 which, in the preferred embodiment, is part of a dual-purpose pentode-triode tube, such as the 6CG8 type. The grid electrode 161 is interconnected with the anode electrode 162 of oscillator stage 112 through the selected oscillator coil 165 on the movable disk, coupling condenser 163 and inductance 164. The selected coil 165 is connected through contacts 166, 167. A fine tuning condenser indicated at 170 is adjustable through the fine tuning shaft 22 of the tuner (see Figures 1 to 4), for adjusting the plates 38, 40 of the indicated condenser 20. The B+ supply for the oscillator stage 112 is supplied through dropping resistor 168. The oscillator output frequency is coupled through small intercoupling condenser 171 to the grid input 148 of the mixer stage 111.

It is now apparent that the twelve VHF channels are selectable by rotation of the disk 10 through the control shaft 21, moving into position a desired one of the twelve sets of the VHF coils corresponding from any one channel to the coils 120, 140, 145 and 165 of Figure 11. The fixed portion of the tuner circuitry is unchanged, and the parameters are selected for maximum practical efficiency for all of the twelve channels. When it is desired to tune in and receive UHF channels in the range 470 to 890 megacycles, the disk 10 is moved by control shaft 21 to the "UHF" or thirteenth position. This is the position referred to without any coils, and in the present invention utilized for the transfer to UHF, and conversion of the VHF tuner to a two-stage IF amplifier at the indicated forty megacycles.

Figure 12:
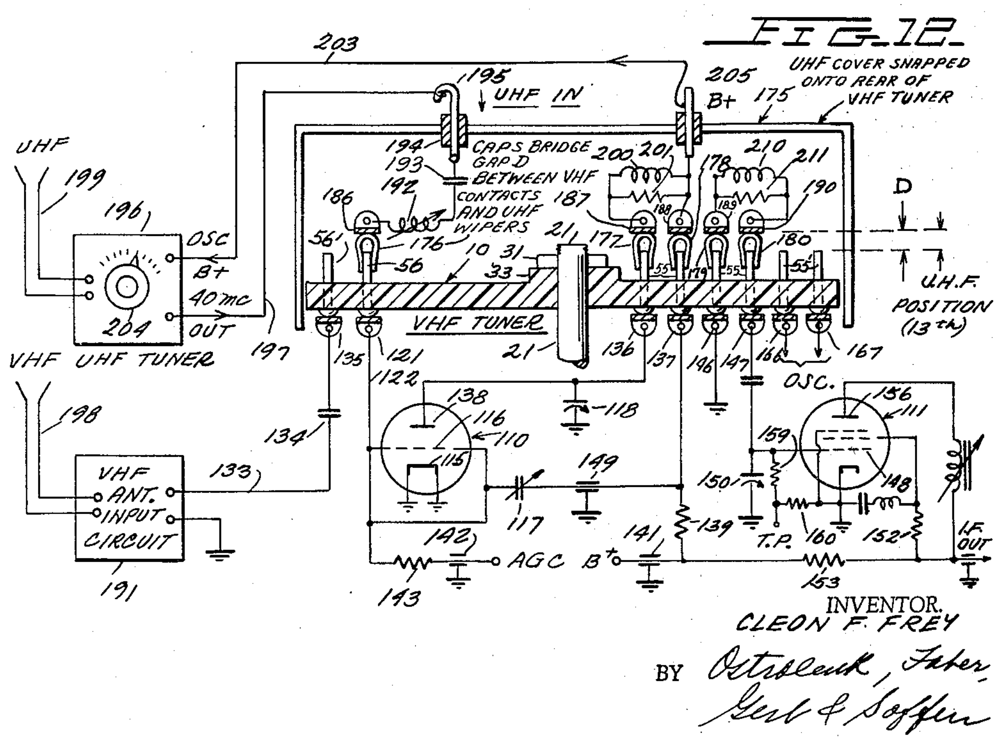
Figure 12 is a circuit diagram of the VHF tuner with the UHF conversion cover, in the UHF reception position.

Figure 12 is an overall schematic diagram of such UHF mode of operation of the VHF tuner, with the UHF cover 175 applied to the back of the tuner disk to effect such conversion. It is noted in Figure 12 that the VHF tuner section remains intact with the exception of the attachment of the "UHF cover" or shield 175 in place of the blank shield 23, (see Figure 2). In Figure 12, the indicated position for UHF reception of the coil disk 10 in its coaction with the fixed contactor pairs 51, 52, 53, 54 is with no coil connected to the respective pin sets 55, 56 (see also Figure 7). Mounted on the blank coil pins 55, 56 are individual contact extensions or caps 176—180. The metallic caps 176—180 are positioned upon the corresponding pins 55, 56 when it is desired to convert the VHF tuner to UHF usage. They afford contacts for additional contactors affixed to the UHF cover 175 and enable such contacts to be spaced from the pins 55, 56 in order that no connection is made with the corresponding pins for the twelve VHF channels. Thus when the VHF tuner is moved to the thirteenth or UHF position the extension contacts 176—180 interconnect with the corresponding spring contactors 186—190 respectively in UHF cover 175.

An important feature of the invention system is noted in that the VHF antenna input circuit 191 is effectively isolated from the main tuner circuit in that its connection to spring contactor 135 through coupling condenser 134 is terminated in the pin 56' which is unconnected to the remainder of the circuit in the UHF connection mode.

Instead, the UHF input signals are connected through spring contactor 121 and lead 122 to the grid input 116 of amplifier 110 through the spring cap 176 mounted on the associated pin 56. This is accomplished through a tunable series coil 192 and condenser 193 connected to insulated UHF input terminal 195 projecting from the cover of UHF shield 175 with insulation 194 therebetween.

The heterodyned output of UHF tuner 196, at forty megacycles, is connected through lead 197 to the terminal 195, and in turn to the grid 116 through the spring contactor 186 affixed to cover 175. Contactor 186 engages the cap contact 176 when the disk 10 is motivated by control shaft 21 to the indicated UHF transfer position. In this manner the VHF antenna 198 and its associated input circuit 191 is isolated from the amplifier stage 110, and the UHF antenna 199 and its associated tuning unit 196 is placed directly in circuit with the input 116 of amplifier stage 110 at the forty megacycle intermediate frequency, and through the series tuning circuit 192, 193 tuned for the efficient input to stage 110 at forty megacycles. The amplifier stage 110 is the first amplifier stage of the heterodyned UHF input thereto at forty megacycles.

The output circuit of amplifier stage 110 is also tuned at the forty megacycles IF frequency in the UHF mode. This is accomplished by connecting a suitable coil 200 at the indicated UHF transfer position between the contact caps 177, 178, connected to the output contactors 136, 137 for the triode stage 110. This is accomplished by the fixed spring contacts 187, 188 across which the coil 200 is connected together with a shunt resistor 201. The coil 200 in conjunction with the capacitance 118 in the output 138 of tube 110 completes the IF amplification stage of the tuner at stage 110 in this UHF utilization mode of operation.

A further important feature of the invention system is the provision of the B+ supply for the UHF tuner 196 activation, when the VHF tuner is in the UHF reception mode. This is accomplished by connecting B+ terminal 205 to contact cap 178 through spring contactor 188 and lead 202. Thus terminal 205 is connected directly to the VHF B+ supply through dropping resistor 139. The B+ supply for the heterodyning oscillator in the UHF tuner 196 is connected through lead 203 to the B+ terminal 205. It is noted that the B+ voltage on terminal 205 is present only when the VHF tuner disk 10 is in the indicated UHF transfer position in view of the necessary connection through contact cap 178 through spring contact 188. In the other twelve VHF channel reception positions of disk 10 there is no B+ voltage connection to the spring contact 188 and the UHF tuner 196.

Accordingly, UHF tuner 196 generates the IF forty megacycle output heterodyning signals only when disk 10 is in its UHF position. During the VHF twelve-channel mode of reception, there is no contact cap connection to spring contactor 186 as through contact cap 176, and therefore no output connection between the UHF tuner 196 and the input grid 116 of triode 110. A simple, effective and inexpensive means is thereby provided to render the UHF tuner 196 inoperative and unconnected to the VHF tuner circuitry during the VHF reception mode; and in turn readily connected to the UHF mode with two-stage IF amplification by tubes 110 and 111 and direct activation of the heterodyning of the UHF tuner 196 through the B+ supply to its oscillator through terminal 205.

The establishment of the VHF and the UHF modes for the VHF tuner is simple, direct and occurs by merely rotating control shaft 21 to VHF or UHF reception conditions. Tuning of the control knob 204 of the UHF tuner 196 selects any one of the seventy UHF channels, which are thereupon heterodyned by the self-contained oscillator to the common forty megacycle output.

The VHF mixer stage 111 is also converted to operate as an efficient IF amplifier, constituting the second stage of IF amplification for the basic heterodyned UHF signals. This is accomplished by connecting a coil 210 across the input circuit of the pentode 111. The coil 210 is connected in shunt with resistor 211 and across condenser 150, and selected for efficient amplification of the forty megacycle IF frequency. Coil 210 is connected through the UHF cover contactors 189, 190 to the contact caps 179, 180 on pins 55 which connect to the VHF tuner contactors 146, 147. Contactor 147 couples the coil 210 to the condenser 150 and grid 148 through coupling condenser 149. The output circuit 156 of stage 111 is connected to the IF coil 157 to the IF output of the tuner.

Another important feature of the invention system resides in the isolation of the VHF oscillator 112 during the UHF mode of operation. This is accomplished by arranging for the connection pins 55 corresponding to the oscillator circuit, those to VHF contactors 166, 167 to remain out of the UHF circuit. In this manner, the oscillator circuit is completely isolated as the coil 165 of the normal VHF mode is unconnected to inactivate or render inoperative the VHF oscillator stage 112. Thus, there is no interference with the normal two-stage IF amplification effected in the UHF transfer position of Figure 12 for stages 110 and 111 of the VHF tuner.

In summation, in the invention system, in the UHF mode of operation, the UHF cover 175 and associated contact caps 176—180 effectively:

(*a*) disconnects the VHF antenna 198 and antenna input circuit 191;

(*b*) disconnects the oscillator 112 of the VHF section;

(*c*) effectively connects the output 197 of the UHF tuner 196 to the input of the VHF stage 110;

(*d*) energizes the oscillator of the UHF unit 196 through the B+ terminal 205; and (*e*) connects the VHF tuner circuitry as a two-stage IF amplifier.

The transfer to such UHF mode of operation is effected simply, readily and with little additional cost. As noted above, simply positioning of the VHF tuner disk 10 to the UHF transfer or "thirteenth position" effectuates the UHF transfer mode, without interfering with the normal operation of the twelve VHF channel tuner positions or VHF operations thereof in the VHF mode.

The UHF and VHF modes of operation of the tuner, in the present invention, is directly available to the operator through control shaft 21. As stated above, when plain VHF shield cover 23 is on the tuner, only the twelve VHF channels are tunable and operable through the tuner, the thirteenth position having no utility. When the UHF conversion cover is placed on the VHF tuner in place of the plain VHF cover 23, the VHF mode operates for the twelve channels, and the UHF mode is effective only at the "thirteenth" or "transfer position."

Figure 13:
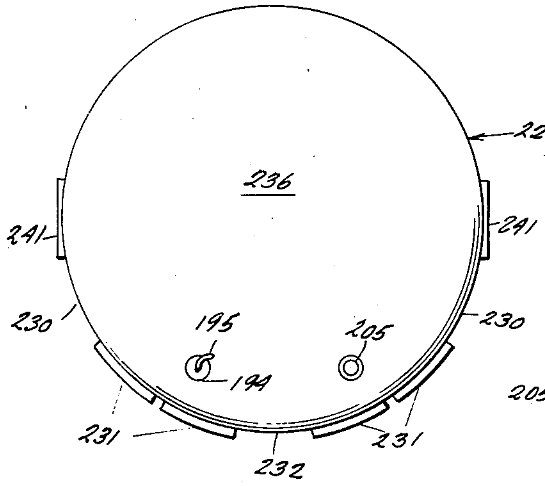
Figures 13 and 14 are respective rear and side elevational views of the UHF conversion cover.
Figure 14:
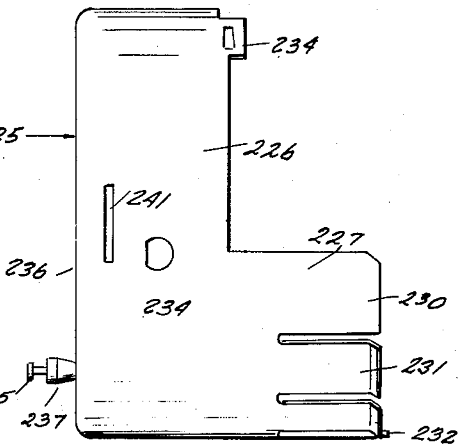

Figures 13 and 14 are respective rear and side elevational views of an exemplary UHF conversion cover 225. The conversion cover or shield 225 corresponds to the diagrammatic UHF conversion cover 175 of Figure 12. The cover 225 is a radiation shield for the VHF tuner, and corresponds in shape to the cylindrical shield 23 it replaces in the VHF tuner embodiment described hereinabove. It is of course obvious that other shapes may be used for the cover 225. The cylindrical body portion 226 of the shield 225 encompasses the movable disk 10 and associated coils of the tuner. Aperture 224 is for introduction of a screw-driver to adjust the individual oscillator plugs 84 (see Figure 9) for the VHF operation. The axially projecting semi-circular section 227 comprises a plurality of spring fingers 230, 231, 232. The fingers 231 have outwardly extending lips for ready sliding over the front plate 12. The end fingers 230, 230 are straight, and close the cylindrical tuner structure. The central projecting finger 232 has a transverse slot at its end for engaging a lug 19 (see Figure 16) projecting from tuner base 12.

Figure 16:
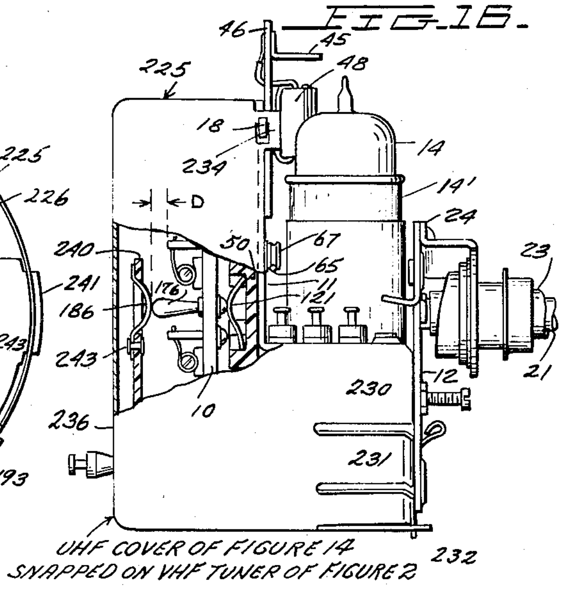
Figure 16 is a side-elevational view of the VHF tuner with the invention UHF cover thereon, partially broken away.

Similarly, two ears 234 project on either side of the cylindrical cover body 226, and engage associated lugs 18 in the back base 11 of the tuner (see Figure 16). Thus the cylindrical shield 225 readily engages with the body of the VHF tuner through the spring fingers 230, 231, 232 and interlocks therewith through the associated slots and lugs. Projecting from the rear plate 236 of the shield cover 225 is the UHF connection post 195 and the UHF B+ supply post 205. The B+ supply post 205 extends from the metallic shield back 236 through an integral feed-through condenser 237, the exterior portion of which is grounded through the shield 225 and the grounded chassis of the tuner.

Figure 15:
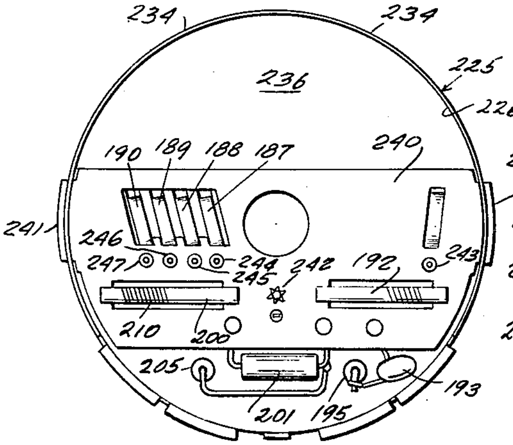
Figure 15 is an interior elevational view, enlarged, of the UHF cover of Figures 13 and 14.

Figure 15 is an enlarged interior view of the UHF conversion cover 225. The spring contactors 186 to 190 are mounted in phenolic plate 240 secured in the cover 225. Contactors 186—190 correspond to those shown in Figure 12, and interconnect with associated coils, etc., mounted with the UHF cover 225 as is indicated in Figure 12. Phenolic mounting plate 240 is secured to the cylindrical portion 226 of the cover 225 through ears 241, 241 projecting through corresponding slots (see Figure 14), in the cover 225. A metallic post has one end riveted at 242 to the plate 240, and is proportioned to rest against the back plate 236 to hold mounting plate 240 mechanically stable.

An end of each of the springs 186—190 is riveted at 234 to 247 respectively to board 240. The opposite ends of the spring contactors 186 to 190 are free, and exert spring pressure on the extension contact caps 176—180 on the connection posts 55, 56 in the UHF transfer position described hereinabove. The forty megacycle coupling circuit 192, 193 of Figure 12 is indicated at coil 192 and disk condenser 193 in Figure 15. The forty megacycle interstage coils 200, 210 of the circuit of Figure 12 are indicated on a common coil form mounted on panel 240. The resistor 201 in shunt with coil 200 is seen in Figure 15 connected to the B+ post 205.

Figure 16 is a side elevational view of the VHF tuner with the UHF conversion cover 225 mounted thereon. A partial interior view of such assembly appears in this broken away illustration. The panel 240 has one contact spring 186 mounted between rivet 243 and a slot 248 therein. The spring contactor 186 is in engagement with the corresponding contact cap 176 mounted on a connection post 56 on movable coil disk 10. The corresponding spring contactor 121 mounted on the VHF contactor assembly 50, is shown in connection with the head of the pin within contact cap 176. The circuitry established between VHF contactor 121, pin 56, cap 176 and UHF contactor 186 is in the UHF mode, corresponding to that described in connection with Figure 12. It is to be understood that the other contactors and extension cap connections requisite for the UHF mode are established in a similar manner within the tuner corresponding to that described in connection with Figure 12.

Figure 17:
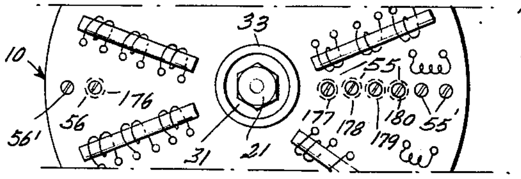
Figure 17 is a portion of the plan view of the rear coil face of the rotatable disk of the VHF tuner at the UHF reception position.

Figure 17 shows a section of the movable coil disk 10 including the thirteenth (UHF mode) position. The contact pins 55 and 56 which have no coil connections thereto are shown with contact caps 176 to 180, in the manner of Figure 12 and indicated in dotted lines. The uncapped contact posts 56′ for the antenna section, and 55′ for the oscillator section, remain unconnected in the UHF mode. The corresponding coils for the other VHF positions adjacent the UHF transfer position indicated in Figure 17, correspond to the coil sets shown and described for the VHF tuner in connection with Figure 9.

Figure 18:
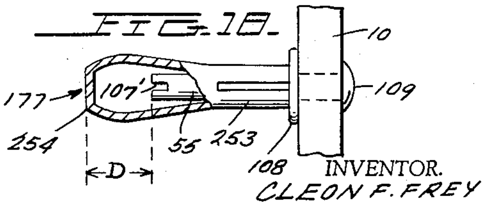
Figure 18 is an enlarged view of a coil connection pin in the coil disk, with a contact cap for UHF use positioned thereon.

Figure 18 is an enlarged view, partly broken away, of a contact pin 55 mounted firmly in movable disk 10. Contact pin 55 has a rounded head 109 for electrical connection with the VHF fixed contactor 50 as already described. The interior post end has a transverse slot 107′ for facilitating soldering or connection of coil ends thereto. A contact cap 177 is indicated in Figure 18, corresponding to the caps 176 to 180. The neck 253 of the cap 177 comprises a slotted portion to maintain a spring contact grip on post 55. The head portion 254 of the contact cap 177 extends beyond the end 107′ of the post 55 by a predetermined distance D (see also Figures 12 and 16), to effect the selective UHF transfer mode, as will now be understood by those skilled in the art. The contact cap 177 may take various equivalent forms to accomplish the required function.

Although I have described a preferred embodiment for carrying out the principles and features of my invention, it is to be understood that variations may be made within the broader spirit and scope of the invention as defined in the following claims.

I claim:

1. A VHF television tuner convertible for UHF operation comprising a rotatable disc containing a plurality of sets of tuning coils at one face thereof, contact sets at the other disc face connected individually through the disc to associated tuning coil sets, a set of VHF contactors fixed in the tuner and serially coactable with said contact sets for selective VHF channel reception upon rotation of the disc, an auxiliary contact set at said other disc face oriented to effect the UHF operation tuner mode when the disc is correspondingly positioned therefor, a removable cover section securable to the tuner opposite the disc coil set face, an auxiliary contactor set mounted interiorly of the cover section, said auxiliary contact set having projections extending through the disc that electrically connect with said auxiliary contactor set when the disc is in its said UHF position, said auxiliary contact set also being in electrical connection with the VHF contactor set and the tuner circuit when in the UHF position, and circuit means carried by said removable cover section in circuit with the auxiliary contactor set thereof to convert the VHF tuner circuit to a two-stage intermediate frequency amplifier during the UHF operation mode for amplification of UHF broadcast signals heterodyned to the intermediate frequency by an external UHF tuner in connection with one of the auxiliary contactors.

2. A television tuner as claimed in claim 1, further including a through-terminal extending from the exterior of the cover section and connected interiorly to a specific auxiliary contactor therein, said specific auxiliary contactor being positioned for electrical connection with a contact on the disc of the auxiliary contact set thereof that in turn connects with a VHF contactor at suitable B+ supply potential when the disc is positioned for the UHF operation, whereby the external UHF tuner is energized by the B+ potential through said through-terminal solely during the UHF operation mode.

3. A removable conversion cover for a VHF television tuner with a rotatable disc containing VHF tuning coil sets and a UHF contact set at its UHF operation mode position, said conversion cover comprising a sheet metal cap with fastening means for removably gripping the tuner opposite the disc and in predetermined relation thereto, an insulation member mounted interiorly of the cap, a set of contactors carried by said member at a predetermined orientation for electrical connection with the UHF contact set on the tuner disc solely in the UHF operation mode, circuit means supported in the cap in circuit with the contactor set thereof to convert the VHF tuner circuit to a two-stage intermediate frequency amplifier during the UHF operation mode for amplification of UHF broadcast signals heterodyned to the intermediate frequency by an external UHF tuner in connection with one of the auxiliary contactors, said cap being an effective radiation shield for the end section of the tuner containing the disc and the VHF tuning coil sets.

4. A removable conversion cover as claimed in claim 3, further including a through-terminal extending from the exterior of the cap and connected interiorly to a specific contactor therein, said specific contactor being positioned for electrical connection with a contact on the disc of the UHF contact set thereof that is supplied with a suitable B+ potential when the disc is at its UHF operation mode position, whereby the external UHF tuner is energized by the B+ potential through said through-terminal solely during the UHF operation mode.

References Cited in the file of this patent

UNITED STATES PATENTS

| | | |
|---|---|---|
| 2,682,645 | Patla | June 29, 1954 |
| 2,772,354 | Browder | Nov. 27, 1956 |
| 2,810,827 | Nordby | Oct. 22, 1957 |
| 2,826,687 | Fisher | Mar. 11, 1958 |